F. S. BARKELEW.
STEAM MOTOR FOR OPERATING TOOLS IN DRILLING RIGS.
APPLICATION FILED JULY 16, 1907.
12,904. Reissued Dec. 29, 1908.
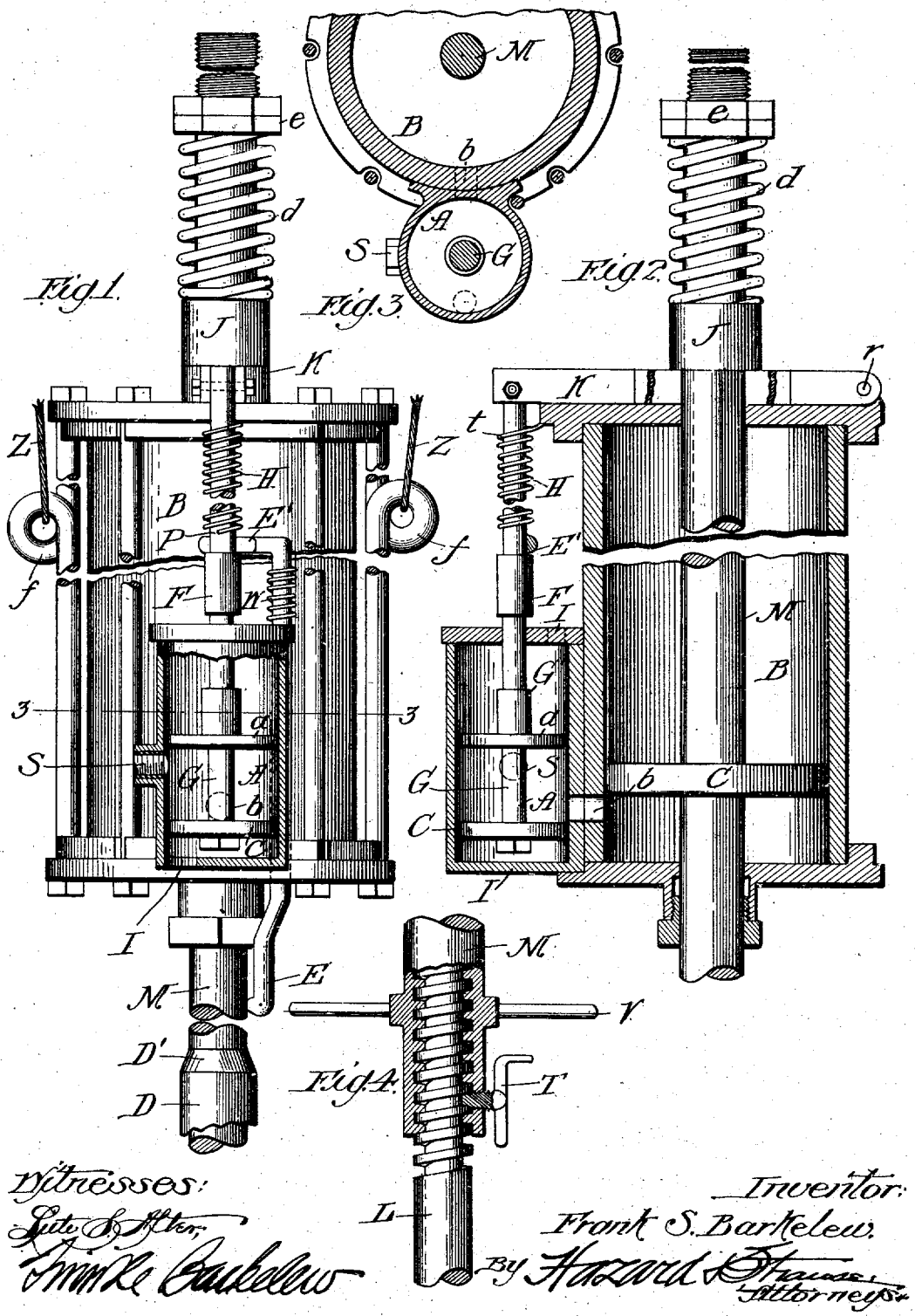
Witnesses:
Geo. S. Ritter
Frank R. Barkelew
Inventor:
Frank S. Barkelew.
By Howard Thomas
Attorneys.
THE NORRIS PETERS CO., WASHINGTON, D. C.

UNITED STATES PATENT OFFICE.

FRANK S. BARKELEW, OF LOS ANGELES, CALIFORNIA, ASSIGNOR TO THE CALIFORNIA STEAM DRILLING RIG COMPANY.

STEAM-MOTOR FOR OPERATING TOOLS IN DRILLING-RIGS.

No. 12,904. Specification of Reissued Letters Patent. Reissued Dec. 29, 1908.

Original No. 795,017, dated July 18, 1905, Serial No. 168,113. Application for reissue filed July 16, 1907. Serial No. 384,117.

*To all whom it may concern:*

Be it known that I, FRANK S. BARKELEW, a citizen of the United States, residing at Los Angeles, in the county of Los Angeles and State of California, have invented new and useful Improvements in Steam-Motors for Operating Tools in Drilling-Rigs, of which the following is a specification.

My invention relates more particularly to the means whereby the drilling-bit is elevated in drilling wells; and the object of my invention is to provide a motor for operating drilling-rigs in which the steam is employed directly to elevate the drilling-tool.

I accomplish this object by means of the device described herein and shown in the accompanying drawings in which:—

Figure 1.— is a side elevation of my drill-operating device. Fig. 2.— is a central vertical longitudinal section. Fig. 3.— is a transverse section taken on line 3—3 of Fig. 1. Fig. 4.— is a fragment of the lower end of the piston-rod and the upper end of the temper-screw.

The device is secured to the drilling rig or derrick by the ropes Z, Fig. 1, secured to eyelets *f* on the device, the drilling-bit (not shown) being secured in the usual manner to the temper-screw L. When in this condition, steam connection is made with the port S, whereby live steam is fed into the primary cylinder A (having an opening in the top and bottom for the escape of steam) between the pistons *a* and *c* on the stem G, and the steam passes thence through the port *b* under the piston C on the piston rod M in the cylinder B. This will cause the piston C on the rod M to move up and carry with it the temper-screw L and the attached drilling-bit. As the piston-rod M moves up it will carry with it the lock-nuts *e*, which form the upper seat of the spiral spring *d*, the lower end of the spring *d* resting on the sleeve J, loose on the piston-rod M.

On the right hand side and at the upper end of the cylinder B is pivoted the lever K, as at *r*. To the free end of this lever is pivotally secured the piston-rod G, upon which is mounted the pistons *a* and *c*. On the upper head of the cylinder B, as at *t*, the spiral spring H, surrounding the piston-rod G, is secured. The lower end of this spring is secured to the stem G, as at *p*. The tendency of this spring is to elevate the piston-rod G. Below the point where the spring H is secured to the rod G is keyed a sleeve F.

Mounted on the side of the primary cylinder is rotatably secured the trip-rod E. Coiled around the upper part thereof is the spring W, the tendency of which is to cause the horizontal portion E′ of the trip-rod to contact with the piston-rod G above the sleeve F and is normally held in contact with the piston-rod G by this spring. The trip-rod is thrown out of engagement therewith as the piston C in the main cylinder moves up, carrying with it the cone-shaped sleeve D, adjustably mounted on the piston-rod M. The upper cone-shaped portion D′ of the sleeve D engages with the rounded lower end of the trip-rod E. This will operate to throw the upper horizontal portion of the trip-rod E′ away from the stem and off the collar F, which will permit the spring H to raise the piston-stem G, secured thereto.

When the piston C moves up after the admission of steam into the cylinder B, the lock-nuts *e*, forming the upper seat of the spring *d*, will permit the sleeve J to move up. When the tension on the spring *d* is removed, the spring H, acting on the piston-stem G, pivoted to the free end of the lever K, will cause the free end of the lever to move up, carrying with it the piston-rod G and the pistons *a* and *c* thereon. This spring will move the piston-stem G up until the shoulder G′ on the piston-stem contacts with the upper head of the primary cylinder, and thereby limit the upward stroke of the pistons *a* and *c*. Thus it will be seen that when the shoulder G′ is in contact with the upper head of the cylinder the lower piston *c* will rest between the ports S and *b* and while in this position the steam will exhaust from the cylinder B through the ports I and *b*. When in this position, the steam having been removed from below the piston C, the weight of the tool and temper-screw secured thereto will carry the piston down, and with it the piston in the primary cylinder will assume the position shown in Fig. 2, when steam will again be fed into the cylinder B and again raise the piston C, when the operation is repeated. The lock-nuts *e* on the piston-rod M may be adjusted as to height so as to regulate the time when steam is readmitted into the cylinder B. In operating the rig the usual handles V are rigidly affixed to the piston rod M, and in rotating the handles the piston C turns with it. The lower part of the piston-rod M is screw-threaded for the reception of the temper-screw L. I have shown the usual set-screw T, by means of which the temper-screw and the piston-rod are rigidly secured together during the operation of drilling, the temper-screw being released when it is desired to drop the drilling-bit farther down.

Having described my invention what I claim as new and desire to secure by Letters Patent is:—

1. The herein-described means to operate the drilling-tool in a drilling-rig comprising the following elements in combination; the cylinders A and B the port *b* leading from one cylinder to the other, the piston-stem M having piston C thereon in the cylinder B, the piston-stem G having pistons *a* and *c* thereon; and provided with fixed sleeve F thereon; the steam-inlet port S communicating with the cylinder A, the spiral spring *d* on the piston-rod M mounted as shown and described; the spiral spring H mounted on the piston-stem G as shown and described, the trip-rod E revolubly mounted on the frame, the spring W, and the adjustable cone-shaped sleeve D.

2. A steam motor, comprising a cylinder and a piston therein, valve means to control the cylinder admission and exhaust, connecting means between the piston and the valve to operate the valve to its admission position, means to hold the valve in its admission position, means operating independently of the piston motion to move the valve to its exhaust position, and means connected to the piston to release the valve holding means.

3. A steam motor, comprising a vertical cylinder, a gravity actuated piston therein, a valve controlling the cylinder admission and exhaust below the piston, means actuated by the downward movement of the piston to move the valve into its admission position, and means operating independently of the piston motion adapted to move the valve to its exhaust position at a predetermined piston position.

In witness that I claim the foregoing I have hereunto subscribed my name.

FRANK S. BARKELEW.

Witnesses:

TRIMBLE BARKELEW,
OLLIE PALMER.